United States Patent
Dolmaire et al.

(10) Patent No.: US 10,412,807 B2
(45) Date of Patent: Sep. 10, 2019

(54) CURRENT SOURCE SHARED BY A PLURALITY OF LIGHT EMITTERS

(71) Applicant: VALEO VISION, Bobigny (FR)

(72) Inventors: Lionel Dolmaire, Bobigny (FR); Arnaud Faivre, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/983,659

(22) Filed: May 18, 2018

(65) Prior Publication Data

US 2018/0338361 A1 Nov. 22, 2018

(30) Foreign Application Priority Data

May 19, 2017 (FR) ..................... 17 54480

(51) Int. Cl.
| | |
|---|---|
| *H05B 33/08* | (2006.01) |
| *B60Q 3/80* | (2017.01) |
| *F21S 43/14* | (2018.01) |
| *F21Y 113/13* | (2016.01) |
| *F21Y 115/10* | (2016.01) |

(52) U.S. Cl.
CPC ........... *H05B 33/0857* (2013.01); *B60Q 3/80* (2017.02); *F21S 43/14* (2018.01); *H05B 33/0824* (2013.01); *F21Y 2113/13* (2016.08); *F21Y 2115/10* (2016.08)

(58) Field of Classification Search
CPC .. H05B 33/0857; H05B 33/0824; B90Q 3/80; F21S 43/14; F21Y 2113/13; F21Y 2115/10
See application file for complete search history.

(56) References Cited

U.S. PATENT DOCUMENTS

| | | | | |
|---|---|---|---|---|
| 2008/0258695 A1* | 10/2008 | Kumar | ............... | H05B 33/0818 323/223 |
| 2010/0194274 A1* | 8/2010 | Hoogzaad | .......... | H05B 33/0803 315/51 |
| 2013/0002157 A1* | 1/2013 | van de Ven | ........ | H05B 33/0824 315/192 |
| 2013/0207548 A1* | 8/2013 | Leshniak | ........... | H05B 33/0803 315/121 |
| 2013/0313987 A1* | 11/2013 | Chu | ................... | H05B 33/0824 315/193 |
| 2014/0210367 A1* | 7/2014 | Zijlman | ............... | H05B 33/083 315/188 |

(Continued)

OTHER PUBLICATIONS

French Preliminary Search Report dated Jan. 22, 2018 in French Application 17 54480 filed on May 19, 2017(with English Translation of Categories Cited).

*Primary Examiner* — Dedei K Hammond
*Assistant Examiner* — Raymond R Chai
(74) *Attorney, Agent, or Firm* — Oblon, McClelland, Maier & Neustadt, L.L.P.

(57) ABSTRACT

A lighting module including a light source with a carrier and at least two light emitters that are placed on the carrier and that have a common electrode; and a power-supplying electrical circuit for supplying the light emitters with power. The power-supplying electrical circuit includes a current source that is connected, via switches, to the light emitters of the light source, and a control circuit for controlling the switches, so as to allow each of the emitters to be selectively supplied with power by the current source.

14 Claims, 1 Drawing Sheet

(56) References Cited

U.S. PATENT DOCUMENTS

Figure 1:
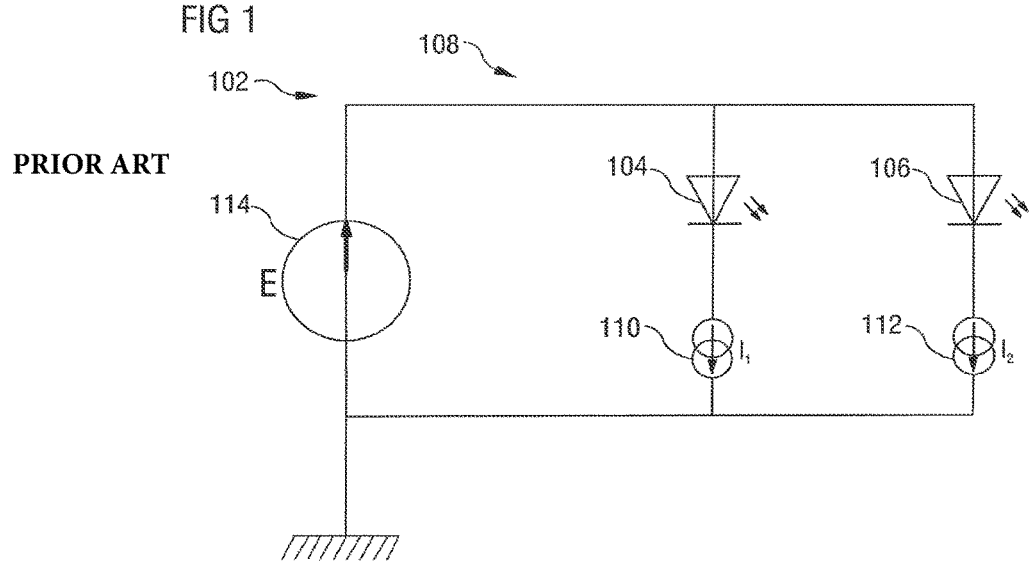

| | | | |
|---|---|---|---|
| 2014/0217909 A1* | 8/2014 | Chu | H05B 33/0827 |
| | | | 315/192 |
| 2014/0312771 A1* | 10/2014 | Lee | H05B 33/0803 |
| | | | 315/113 |
| 2015/0061499 A1* | 3/2015 | Hattrup | H05B 33/0815 |
| | | | 315/122 |
| 2015/0137689 A1* | 5/2015 | Hu | H05B 33/0827 |
| | | | 315/192 |
| 2015/0257223 A1* | 9/2015 | Siessegger | H05B 33/0818 |
| | | | 315/186 |
| 2016/0066381 A1* | 3/2016 | Despesse | H05B 33/0824 |
| | | | 315/191 |

* cited by examiner

CURRENT SOURCE SHARED BY A PLURALITY OF LIGHT EMITTERS

The invention relates to the field of lighting and signalling lights, in particular for motor vehicles.

Light-emitting-diode (LED) light sources are increasingly commonly used, in particular in the field of lighting and signalling lights for motor vehicles. This type of light source is biased and is conventionally supplied with power with management of the current flowing through it in order in particular to control its temperature and its colour (for colour models) or emission spectrum (for models emitting white light). To this end, one current source is conventionally provided specifically for one LED.

However, current sources have a non-negligible cost, this possibly proving to be particularly disadvantageous in the context of a module comprising many light sources.

The objective of the invention is to mitigate at least one of the drawbacks of the aforementioned prior art. More particularly, the objective of the invention is to provide a light-source power supply that is economical and effective.

One subject of the invention is a lighting module comprising: a light source with a carrier and at least two light emitters that are placed on said carrier and that have a common electrode; and an electrical circuit for supplying the light emitters with power; noteworthy in that the power-supplying electrical circuit comprises a current source that is connected, via switches, to the light emitters of the light source, and a circuit for controlling said switches, so as to allow each of said emitters to be selectively supplied with power by the current source.

Advantageously, the control circuit is configured to supply each of the light emitters with power during periods that are separate i.e. that do not overlap.

According to one advantageous embodiment of the invention, the switches comprise a first switch and a second switch, the current source comprising a current input terminal and a current output terminal that are connected by the first switch and the second switch, respectively, to the electrode that is common to the light emitters.

According to one advantageous embodiment of the invention, each of the light emitters of the light source comprises a specific electrode, the module comprising a circuit connecting said electrodes, the switches comprising a third switch and a fourth switch, the current input and output terminals of the current source being connected to said connecting circuit by the third and fourth switches, respectively.

According to one advantageous embodiment of the invention, each of the third and fourth switches is configured, in the closed state, to turn on one of the light emitters.

According to one advantageous embodiment of the invention, the connecting circuit comprises a voltage source.

According to one advantageous embodiment of the invention, each of the light emitters of the light source is a light-emitting diode with a cathode and an anode, the common electrode of the light source corresponding to a cathode and an anode of said emitters.

According to one advantageous embodiment of the invention, the switches may be insulated-gate field-effect transistors.

According to one advantageous embodiment of the invention, the circuit for controlling the switches is configured to supply the light emitters with power in alternation, when said emitters are two in number per light source, or successively and repeatedly, when said emitters are three or more in number per light source, at a frequency of at least 100 Hz.

According to one advantageous embodiment of the invention, the light emitters of the light source are configured to emit white light spectra with colour temperatures that are different from one another by at least 1000 K.

According to one advantageous embodiment of the invention, the light emitters of the light source are configured to emit different monochromatic wavelengths, respectively.

According to one advantageous embodiment of the invention, the light emitters of the light source are configured to emit red, green and blue light, respectively.

According to one advantageous embodiment of the invention, the circuit for controlling the switches is configured to supply the light emitters of the light source with power via a pulse-width-modulated signal.

According to one advantageous embodiment of the invention, said module comprises a plurality of light sources and the power-supplying circuit comprises a current source that is common to the light sources and switches for electrically connecting the common current source to each light source.

According to one advantageous embodiment of the invention, the circuit for controlling the switches is common to the switches of the light sources and current sources.

According to one advantageous embodiment of the invention, the light sources are selectively activatable, the module being an adaptive lighting module.

According to one advantageous embodiment of the invention, the module is a lighting module for the interior of the passenger compartment of a motor vehicle, in particular a ceiling light.

The measures of the invention are advantageous in that they allow one current source to be shared by a plurality of light emitters of a light source. This sharing allows the number of current sources required to be at least halved. In the case of a light source comprising three light emitters, the decrease in the number of current sources is then a factor of 3. In addition, the control circuit of the switches may control the switches by pulse-width modulation so as to control the current flowing through them. By pulse-width modulation, what is meant is such a modulation during each of the supply phases of one or of each of the light emitters.

Figure 2:
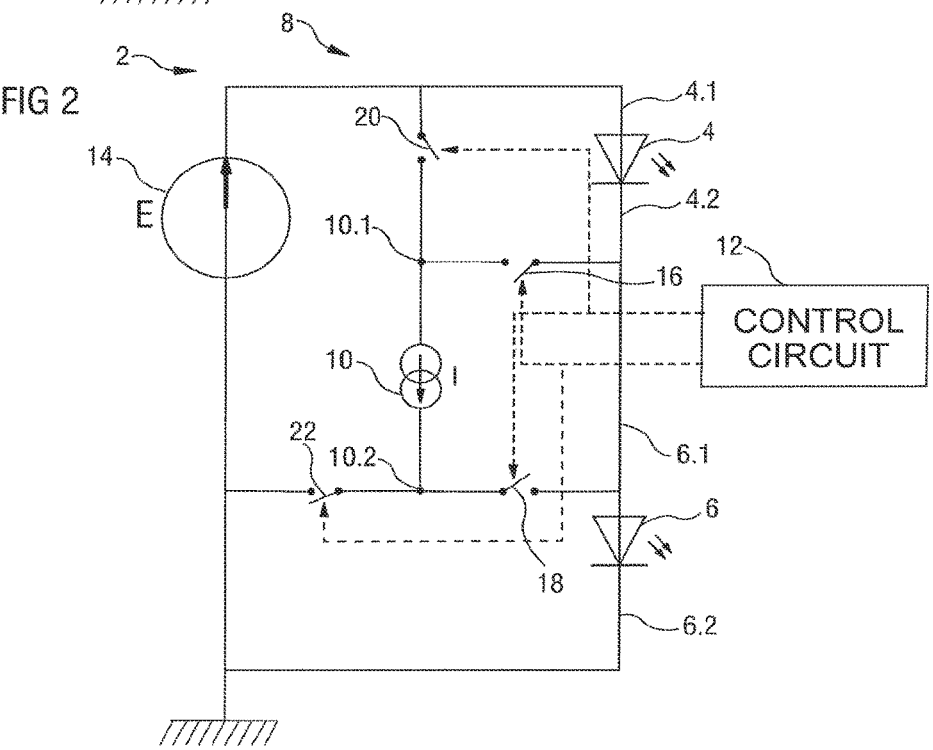

Other features and advantages of the present invention will be better understood from the description and drawings, in which:

FIG. 1 is a circuit diagram of supply of two LED light sources, according to the prior art; and FIG. 2 is a circuit diagram of supply of two light emitters of the same light source, according to the invention.

FIG. 1 illustrates a prior-art lighting module 102 comprising two LED light sources 104 and 106. More particularly, FIG. 1 illustrates a circuit 108 for supplying the light sources 104 and 106 of the module in question with power. As may be seen, the power-supplying circuit 108 comprises two current sources 110 and 112 that are electrically connected in series with the light sources 104 and 106, respectively. The light sources and their respective current sources are connected in parallel and the power-supplying circuit 108 also comprises a circuit connecting the light sources and current sources in parallel, the connecting circuit comprising, in the present case, a voltage source 114. The current sources 110 and 112 comprise means for regulating the current flowing through the light sources 104 and 106, which current is generated by the voltage source 114. Such current-regulating means are well known per se to those skilled in the art.

FIG. 2 illustrates a circuit diagram 8 of supply of a lighting module according to the invention. Similarly to FIG. 1, the module comprises two LED light emitters 4 and 6. However, contrary to FIG. 1, these two light emitters 4 and 6 are placed on the same carrier and thus form part of the same constituent component of a light source 4/6 with two light-emitting zones, these two zones possibly being supplied with power independently. More precisely, the first emitter 4 comprises an anode 4.1 and a cathode 4.2 and, similarly, the second emitter 6 comprises an anode 6.1 and a cathode 6.2. The cathode 4.2 of the first emitter 4 is directly electrically connected to the anode 6.1 of the second emitter, then forming a common electrode. The anode 4.1 and the cathode 6.2 then form the two other electrodes of the three electrodes of the light source.

The power-supplying circuit 8 comprises a common current source 10 that supplies power to the light emitter 4 some of the time and power to the light emitter 6 some of the time. In the present case, a single current source 10 is provided, though it will be understood that it is envisageable to provide (in particular placed in parallel) a plurality thereof, these current sources then being common to the light emitters. The current source 10 is electrically connected to the electrodes of the light source by means of switches 16, 18, 20 and 22. More precisely, the current source 10 comprises a current input first terminal 10.1 and a current output second terminal 10.2, these two terminals ensuring the electrical connection of the current source. Each of the terminals 10.1 and 10.2 is electrically connected to the common electrode 4.2/6.1 of the light source via the switches 16 and 18, respectively. The terminals 10.1 and 10.2 are also connected to the connecting circuit of the light source 4/6 via the switches 20 and 22. More precisely, the current input terminal 10.1 of the current source 10 is connected to the positive terminal of the voltage source 14 via the switch 20, so that closure of said switch short-circuits the first light emitter 4. Similarly, the current output terminal 10.2 of the current source 10 is connected to the negative terminal (which is ground in the present case) of the voltage source 14 via the switch 22. Closure of this switch then has the effect of short-circuiting the second light emitter 6.

The power-supplying electrical circuit 8 also comprises a control circuit 12 for controlling the switches 16, 18, 20 and 22. As may be seen in FIG. 2, this circuit may be configured to control, selectively, the switches 16 and 22, and the switches 18 and 20. These switches may advantageously be insulated-gate field-effect transistors. In the absence of control signals, they are open and do not let current pass.

In a first control mode, only the switches 16 and 22 are closed. This means that the current generated by the voltage source 14 flows exclusively through the first light emitter 4, via the current source 10 ensuring the regulation of the current. In a second control mode, only the switches 18 and 20 are closed, meaning that the current then flows exclusively through the second light emitter 6.

The control circuit 12 may thus share the connection time of the current source 10 between the two light emitters 4 and 6. Thus a single current source may supply a plurality of light emitters with power, and thus the number of current sources may be decreased. This sharing is particularly advantageous, in particular in the context of current regulation by pulse-width modulation (PWM). Specifically, supplying light sources with power in this way means that only some of the supply power is used, making sharing a current source among a plurality of light emitters all the more advantageous.

The control circuit 12 is configured to switch between the two modes in question at a given frequency, such as for example higher than or equal to 100 Hz and preferably higher than or equal to 200 Hz. Thus, the light emitters give the impression of being continuously turned on even though they are only supplied with power some of the time. The control signals of the switches may also be pulse-width modulated so as (in addition to setting how the current source is shared) to regulate the current means during each of the sharing modes. In this case, the current source may be configured or constructed in a simpler way, such as for example so as to deliver a constant current.

In the example that was just described, the light source comprises two light emitters 4 and 6. It will however be understood that it may comprise more light emitters, such as for example three light emitters. In this case, it is possible to make provision for two additional switches. The third light emitter may be placed in parallel with one of the first and second emitters 4 and 6. The additional switches may then be placed so that one switch is present in each of the two parallel branches, this then allowing the branch through which the current will flow to be selected. It will also be understood that other configurations are possible.

The light source 4/6 may be of the type that produces white light. In this case, the light emitters may be configured to produce the light with different colour temperatures, this difference possibly being larger than or equal to 1000 K. More precisely, one of the emitters may produce what is called warm white light, i.e. with a colour temperature starting at 2700 K, and the other may produce what is called cold white light, i.e. with a colour temperature ending at 6500 K. Supplying power to both emitters then produces white light with an intermediate colour temperature, in particular depending on how the current source is shared.

Alternatively, the light source may be of the colour type, i.e. it may produce various quasi-monochromatic colours. By way of example, it may comprise three light emitters, namely a first emitted producing red light, a second producing green light and a third producing blue light. Depending in particular on how the current source is shared between the three emitters in question, various colours may be obtained.

It will also be noted that the lighting module may comprise a plurality, or even many, light sources, and corresponding current sources. These light sources may then be arranged to form a matrix array. They may be supplied with power discretionarily.

The invention claimed is:

1. A lighting module comprising:
a light source with a carrier and at least two light emitters that are placed on said carrier and that have a common electrode that is common to the at least two light emitters, each of the at least two light emitters of the light source including a plurality of electrodes;
a power-supplying electrical circuit for supplying the at least two light emitters with power, and
a connecting circuit connecting the plurality of electrodes; wherein
the power-supplying electrical circuit comprises a current source that is connected, via a plurality of switches, to the at least two light emitters of the light source, and a control circuit for controlling said switches, so as to allow each of said emitters to be selectively supplied with power by the current source,
the plurality of switches comprise a first switch, a second switch, a third switch, and a fourth switch, the current source comprising a current input terminal and a current output terminal that are connected by the first switch and the second switch, respectively, to the common electrode, and the current input and output terminals of the current source being connected to the connecting circuit by the third and fourth switches, respectively.

2. The lighting module according to claim 1, wherein the third switch is configured to short-circuit a first light emitter of the at least two light emitters, and the fourth switch is configured to short-circuit a second light emitter of the at least two light emitters.

3. The lighting module according to claim 2, wherein the connecting circuit comprises a voltage source.

4. The lighting module according, to claim 1, wherein the connecting circuit comprises a voltage source.

5. The lighting module according to claim 1, wherein the common electrode of the light source corresponds to a cathode of a first light emitter and an anode of a second light emitter, the cathode and the anode being directly electrically connected to each other to form the common electrode.

6. The lighting module according to claim 1, wherein the switches are insulated-gate field-effect transistors.

7. The lighting module according to claim 1, wherein the control circuit for controlling the plurality of switches is configured to supply the at least two light emitters of the light source with power in alternation, when the at least two light emitters include three or more light emitters per the light source, at a frequency of at least 200 Hz.

8. The lighting module according to claim 1, wherein the light emitters of the light source are configured to emit white light spectra with colour temperatures that are different from one another by at least 1000 K.

9. The lighting module according to claim 1, wherein the light emitters of the light source are configured to emit different monochromatic wavelengths, respectively.

10. The lighting module according to claim 9, wherein the at least two light emitters of the light source are configured to emit red, green and blue light, respectively by a first light emitter, a second light emitter and a third light emitter of the at least two light emitters of the light source.

11. The lighting module according to claim 1, wherein the control circuit for controlling the switches is configured to supply the at least two light emitters of the light source with power via a pulse-width-modulated signal.

12. The lighting module according to claim 1, further comprising:
    a plurality of light sources and the power-supplying electrical circuit having one current source per a light source and a set of switches for electrically connecting each current source to a corresponding light source.

13. The lighting module according to claim 12, wherein all switches of the light sources and current sources are controlled by the control circuit.

14. The lighting module according to claim 12, wherein the light sources are selectively activatable.

* * * * *